US012621623B2

(12) United States Patent
Kitic et al.

(10) Patent No.: US 12,621,623 B2
(45) Date of Patent: May 5, 2026

(54) LOCATING A MOVING ACOUSTIC SOURCE

(71) Applicant: ORANGE, Issy-les-Moulineaux (FR)

(72) Inventors: Srdan Kitic, Chatillon Cedex (FR); Jérôme Daniel, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 148 days.

(21) Appl. No.: 18/839,172

(22) PCT Filed: Feb. 13, 2023

(86) PCT No.: PCT/EP2023/053424
§ 371 (c)(1),
(2) Date: Aug. 16, 2024

(87) PCT Pub. No.: WO2023/156316
PCT Pub. Date: Aug. 24, 2023

(65) Prior Publication Data

US 2025/0159424 A1 May 15, 2025

(30) Foreign Application Priority Data

Feb. 18, 2022 (FR) ........................................ 2201475

(51) Int. Cl.
*H04S 7/00* (2006.01)
*H04R 1/32* (2006.01)
*H04R 5/027* (2006.01)

(52) U.S. Cl.
CPC ............... *H04S 7/00* (2013.01); *H04R 1/326* (2013.01); *H04R 5/027* (2013.01); *H04S 2400/15* (2013.01); *H04S 2420/11* (2013.01)

(58) Field of Classification Search
CPC .... H04S 7/00; H04S 2400/15; H04S 2420/11; H04R 1/326; H04R 5/027
See application file for complete search history.

(56) References Cited

U.S. PATENT DOCUMENTS

| | | | | |
|---|---|---|---|---|
| 12,063,491 B1 * | 8/2024 | Cosnefroy | ............... | H04R 3/04 |
| 2009/0251996 A1 | 10/2009 | Dijk | | |
| 2025/0350901 A1 * | 11/2025 | Silzle | ...................... | H04S 7/303 |

FOREIGN PATENT DOCUMENTS

| | | |
|---|---|---|
| CN | 112858999 A | 5/2021 |
| FR | 2011874 A1 | 3/1970 |

(Continued)

OTHER PUBLICATIONS

International Search Report dated Apr. 18, 2023 for corresponding International Application No. PCT/EP2023/053424, filed Feb. 13, 2023.

(Continued)

*Primary Examiner* — Hai Phan
(74) *Attorney, Agent, or Firm* — David D. Brush; Westman, Champlin & Koehler, P.A.

(57) ABSTRACT

Processing sound signals acquired by at least one microphone, to locate a sound source emitting from a plurality of discrete positions at respective discrete points in time, in a space comprising at least one planar reflective surface. The method includes: obtaining: a first vector $$\vec{u}_0^{(k)}$$

determining a direction of a first acoustic path, direct between the source and the microphone, a second vector $$\vec{u}_n^{(k)}$$

(Continued)

representing a second acoustic path resulting from a specular reflection and arriving at the microphone, and a delay $$\tau_n^{(k)}$$

of second path at the microphone, compared to the direct path; exploiting a property of the specular reflection according to which a Euclidean distance between two positions of the source at two discrete points in time is equal to a Euclidean distance between two respective positions of images of the source and derived from one or more same reflections, respectively at said two discrete points in time.

17 Claims, 3 Drawing Sheets

(56) References Cited

FOREIGN PATENT DOCUMENTS

| | | | | |
|---|---|---|---|---|
| WO | WO-2005088339 A1 * | 9/2005 | ............... | G01S 5/22 |
| WO | WO-2020150598 A1 * | 7/2020 | ............ | H04R 1/406 |
| WO | 2021074502 A1 | 4/2021 | | |
| WO | WO-2023072684 A1 * | 5/2023 | ............ | G10K 15/12 |

OTHER PUBLICATIONS

Written Opinion of the International Searching Authority dated Apr. 18, 2023 for corresponding International Application No. PCT/EP2023/053424, filed Feb. 13, 2023.

Daniel Jerome et al., "Time Domain Velocity Vector for Retracing the Multipath Propagation", ICASSP 2020—2020 IEEE International Conference on Acoustics, Speech and Signal Processing (ICASSP), IEEE, May 4, 2020 (May 4, 2020), p. 421-425, XP033794214.

English translation of the Written Opinion of the International Searching Authority dated Apr. 18, 2023 for corresponding International Application No. PCT/EP2023/053424, filed Feb. 13, 2023.

French Search Report and Written Opinion dated Oct. 25, 2022 for corresponding French Application No. 2201475, filed Feb. 18, 2022.

Sakari Tervo et al., "Spatial Decomposition Method for Room Impulse Responses," Journal of the Audio Engineering Society, vol. 61, No. 1/2, Jan./Feb. 2013.

* cited by examiner

LOCATING A MOVING ACOUSTIC SOURCE

CROSS-REFERENCE TO RELATED APPLICATIONS

This Application is a Section 371 National Stage Application of International Application No. PCT/EP2023/053424, filed Feb. 13, 2023, and published as WO 2023/156316 A1 on Aug. 24, 2023, not in English, which claims priority to French Patent Application No. 2201475, filed Feb. 18, 2022, the contents of which are hereby incorporated by reference in their entireties.

FIELD OF THE DISCLOSURE

This description relates to the field of locating acoustic sources, in particular for the estimation of the acoustic direction of arrival (DoA) by a compact microphone system (for example a microphone capable of capturing sounds in "ambiphonic" or "ambisonic" representation, see below).

One possible application is beamforming for example, which then involves a spatial separation of audio sources, in particular to improve speech recognition (for example for a virtual assistant via voice interaction). Such processing may also be involved in 3D audio coding (pre-analysis of a sound scene in order to code the main signals individually), or may allow spatial domain editing of immersive sound content, possibly audiovisual (for artistic purposes, radio, cinema, etc.). It also allows following which person is speaking in teleconferencing, or detecting sound events (with or without associated video).

BACKGROUND OF THE DISCLOSURE

One approach was proposed in document WO-2021/074502, which uses the velocity vector of a sound to obtain in particular the sound's direction of arrival, its delay (therefore the distance from the source), as well as the delays related to any reflections on the surfaces of a room and the determination of the positions of such surfaces (possibly partitioning surfaces such as walls, the floor, the ceiling, but also reflective surfaces such as tables, screens, etc.). Such an implementation makes it possible to model the interference between the direct wave and at least one indirect wave (from a reflection) and to exploit the expressions of this model on the entire velocity vector (its imaginary part as well as its real part).

An improvement to this approach was proposed in document FR2011874 by using a modified velocity vector, referred to as "generalized", and constructed from the conventional velocity vector which is generally expressed as a function of an omnidirectional component in the denominator. The generalized velocity vector then replaces the conventional velocity vector within the meaning of document WO-2021/074502, but with a component in the denominator which is different from an omnidirectional component. This different component may in fact be more "selective" towards the direction of arrival of the sound.

In an embodiment presented in those documents, it is possible to obtain (from an ambisonic sensor for example) a succession of peaks characterizing an acoustic intensity or energy, and each linked to a reflection on at least one surface, in addition to a peak linked to the arrival of the sound along the direct path (DoA) of the sound from the source.

However, in certain cases of application where the sound source may be moving, a robust method is sought for determining the distance between the source and the microphone as the source moves about, particularly when the precise orientation of the surface(s) causing the reflection(s) at a given moment is not initially known.

SUMMARY

The present description improves this situation.

For this purpose, it proposes relying in particular on the reflections from surfaces, at different discrete points in time.

It therefore relates to a method for processing sound signals acquired by at least one microphone, in order to locate at least one sound source emitting from a plurality of discrete positions at respective discrete points in time (k, k'), in a space comprising at least one planar reflective surface, the method comprising:

obtaining at least, for each point in time k:

a first vector $$\vec{u}_0^{(k)}$$

determining a direction of arrival (DoA) of a first acoustic path, direct between the source and the microphone, at least a second vector $$\vec{u}_n^{(k)}$$

representing a second acoustic path resulting from at least one specular reflection and arriving at the microphone, at least one delay $$\tau_n^{(k)}$$

of the second path at the microphone, compared to the direct path, exploiting at least one property of the specular reflection, according to which a Euclidean distance between two positions of the source at two discrete points in time is equal to a Euclidean distance between two respective positions of images of the source and derived from one or a plurality of same reflections, respectively at said two discrete points in time, in order to determine at least one position ($d^{(k)}$, $d^{(k')}$) of the source relative to the microphone respectively at said plurality of discrete points in time (k, k'), as a function of, for each point in time k:

the first vector $$\vec{u}_0^{(k)},$$

in order to determine a direction (DoA) of the direct path, and both the delay $$\tau_n^{(k)}$$

and the second vector $$\vec{u}_n^{(k)},$$

in order to associate a distance $d^{(k)}$ between the source and the microphone with this direction (DoA) of the direct path.

"At least one sound source, emitting from a plurality of discrete positions at respective discrete points in time" is understood to mean a source which may be moving about and may thus occupy these discrete positions at these respective points in time. Alternatively, there may be several sources having these respective discrete positions.

"At least one surface" is understood to mean possibly a set of parallel surfaces or surfaces forming any angle between them (paired). Thus, "said at least one reflection" may possibly concern a plurality of successive reflections on the surfaces of this set.

It is then demonstrated below that, if the acoustic reflections involved can be considered as specular and if the walls concerned are planar, then the aforementioned property of the preservation of Euclidean distances (illustrated in FIG. 3*a*) makes it possible to obtain the distance from the source to the microphone at different points in time k and k', and to do so based on observations of:

the directions of arrival $$\vec{u}_0^{(k)}, \vec{u}_0^{(k')}$$

from the source to the microphone at these different points in time (S1, S2 in FIG. 3*a*), as well as the directions of arrival to the microphone $$\vec{u}_n^{(k)}, \vec{u}_n^{(k')}$$

of the images ($S1^{(w2)}$, $S2^{(w2)}$ for example in FIG. 3*a*) derived from same reflections (on surface (w2) for example in FIG. 3*a*) and respectively associated with the positions (S1, S2) of the source at different points in time k and k', and the respectively associated delays in arrival $$\tau_n^{(k)}$$

and $$\tau_n^{(k')}.$$

The fact of obtaining these observations for different points in time k, k', etc., and possibly exploiting several reflections for a same time k (for example individual reflections on different surfaces or successively on a plurality of surfaces), allows for example, as presented below in one embodiment, obtaining a system with several equations for which the solutions are the distances $d^{(k)}$, $d^{(k')}$ . . . between each position of the source at a point in time k, k' . . . and the microphone.

It is thus possible to gather a sufficient number of observations, at these different points in time, to solve such a system.

In one embodiment, the method may further comprise:

exploiting, in addition to said property of specular reflection, a second geometric property according to which a projection on a chosen axis of said Euclidean distance between two positions of the source at two discrete points in time corresponds to a projection on the same chosen axis of the Euclidean distance between two respective positions of images of the source and derived from one or a plurality of same reflections, respectively at said two discrete points in time.

This preservation of the projection is illustrated in FIG. 3*b*. Combined with the property of preservation of Euclidean distances, it makes it possible to obtain even more equations and thus to refine the determination of distances $d^{(k)}$, $d^{(k')}$ . . . .

However, in practice, it may impose geometric conditions which are not truly restrictive.

For example, the aforementioned chosen axis is parallel or perpendicular to said at least one surface.

For another example, the microphone is an ambisonic microphone, and is preferably arranged so that the z axis along the height of the microphone is parallel to the chosen axis.

These geometric conditions simply amount to considering that the microphone is placed on a surface such as a table for example (therefore a horizontal surface, perpendicular to the z axis of the microphone), in a space surrounded by surfaces such as walls parallel to the z axis (but not necessarily also parallel to each other), and typically with a floor and a ceiling as other surfaces, which are then perpendicular to the z axis.

As indicated above, the exploitation of the property of specular reflection, combined with the exploitation of the second geometric property (projection on the z axis), may generate a system of equations in which the positions of the source relative to the microphone, for different points in time k, k', are the unknowns. In particular, this system of equations may, in general, be overdetermined (therefore with more equations than unknowns).

With regard to taking into account the different points in time k, k', etc., the sound signals may be acquired in a succession of frames over time, and the first vector $$\vec{u}_0^{(k)},$$

the second vector $$\vec{u}_n^{(k)}$$

and the delay $$\tau_n^{(k)}$$

may be obtained for a plurality of frames respectively corresponding to discrete points in time (k, k').

In particular, it is possible to isolate "the good frames", the ones most useful for obtaining these parameters, and for example to determine a movement of the source between the different points in time corresponding to these frames.

To obtain these parameters, various embodiments may be provided. Of course, the expression for the velocity vector may be used (as described in the documents presented above). However, other techniques may be used, for example the one presented in:

Sakari Tervo, Jukka Pätynen, Antti Kuusinen, Tapio Lokki: "*Spatial Decomposition Method for Room Impulse Response*", Journal of the Audio Engineering Society, Vol. 61, No. 1/2, 2013.

In that document, the parameters come from room impulse responses ("RIR"), recorded by an array of microphones that are simply collocated (without even using ambipohonics here). It will thus be understood that a specifically ambisonic microphone is not necessary for capturing sounds, and that the present description is also not limited to using the velocity vector to obtain the aforementioned parameters.

However, in an embodiment where a velocity vector is used (and more particularly a generalized velocity vector within the meaning of document FR2011874, for better results in general), at least one parameter among the first vector $$\vec{u}_0^{(k)},$$

the second vector $$\vec{u}_n^{(k)}$$

and the delay $$\tau_n^{(k)}$$

may be obtained from the expression of this (generalized) velocity vector, the method then comprising:

applying a time-frequency transform to the acquired signals, based on the acquired signals, expressing a generalized velocity vector in the frequency domain, for a plurality of discrete points in time (k, k'), each generalized velocity vector for a given point in time k characterizing a composition between:

the first acoustic path, direct between the source and the microphone, represented by the first vector $$\vec{u}_0^{(k)},$$

and having a delay $$\tau_0^{(k)}$$

between the emission of a sound by the source and the reception of this sound by the microphone, and at least the second acoustic path, represented by the second vector $$\vec{u}_n^{(k)},$$

and having delay $$\tau_n^{(k)}$$

at the microphone, relative to the direct path.

Typically, the DoA of the source (i.e. the first vector $$\vec{u}_0^{(k)}$$

may be obtained by a technique other than the one using the velocity vector. To obtain the delays $$\tau_n^{(k)},$$

it is nevertheless easier to use the expression in the time domain of the velocity vector, as follows.

To this end, the method may include:

further applying an inverse transform, from frequency to time, to the (generalized) velocity vector in order to obtain, in the time domain, at least one peak linked to one or more reflections on one or more surfaces, in addition to a peak linked to the arrival of the sound along the direct path (DoA), the peak linked to one or more reflections being shifted by delay $$\tau_n^{(k)}$$

relative to the peak linked to the arrival of the sound along the direct path.

The peaks in FIG. 2 illustrate these time shifts $$\tau_n^{(k)}$$

(τ1, τ2, etc.) relative to the delay $$\tau_0^{(k)}$$

between the emission of a sound by the source and the reception of this sound by the microphone.

Examples of equation formulations that the present method proposes to solve in some embodiments are presented below. We consider in the following:

a vector $$\vec{r}_0^{(k)}$$

between the source and the microphone, at a point in time k, written as a function of the first vector $$\vec{u}_0^{(k)}: \vec{r}_0^{(k)} = d^{(k)}\vec{u}_0^{(k)},$$

where $d^{(k)}$ is the Euclidean distance at point in time k between the source and the microphone, a vector $$\vec{r}_n^{(k)}$$

between an image of the source and the microphone, at a point in time k, written as a function of the second vector $$\vec{u}_n^{(k)} : \vec{r}_n^{(k)} = \left(d^{(k)} + \delta_n^{(k)}\right)\vec{u}_n^{(k)},$$

with $$\delta_n^{(k)} = c \cdot \tau_n^{(k)},$$

where c is the speed of sound.

Then the aforementioned property of specular reflection is expressed, for two discrete points in time k and k', by an expression of the following type:

$$\left\|\vec{r}_0^{(k)} - \vec{r}_0^{(k')}\right\|^2 = \left\|\vec{r}_n^{(k)} - \vec{r}_n^{(k')}\right\|^2.$$

This expression $$\|\vec{r}_0^{(k)} - \vec{r}_0^{(k')}\|^2 = \|\vec{r}_n^{(k)} - \vec{r}_n^{(k')}\|^2.$$

can be expanded to:

$$\alpha_n^{(k,k')} d^{(k)} + \alpha_n^{(k',k)} d^{(k')} + \chi_n^{(k,k')} d^{(k)} d^{(k')} + \kappa_n^{(k,k')} = 0,$$

with:

$$\alpha_n^{(k,k')} = 2\left(\delta_n^{(k)} - \xi_n^{(k,k')}\delta_n^{(k')}\right),$$

$$\chi_n^{(k,k')} = 2\left(\xi_0^{(k,k')} - \xi_n^{(k,k')}\right),$$

$$\kappa_n^{(k,k')} = \left(\delta_n^{(k)}\right)^2 + \left(\delta_n^{(k')}\right)^2 - 2\delta_n^{(k)}\delta_n^{(k')}\xi_n^{(k,k')}$$

$$\xi_n^{(k,k')} = \left\langle \vec{u}_n^{(k)}, \vec{u}_n^{(k')} \right\rangle,$$

where the notation <x,y> designates the dot product of two vectors x and y.

Next, the aforementioned second geometric property (preserving the projection on the z axis) results in an expression of the following type:

$$\left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2,$$

where $\vec{u}_z$ is a unit vector parallel to the aforementioned chosen axis, and this expression $$\left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2$$

expands to:

$$\mu_n^{(k,k')} d^{(k)} + \mu_n^{(k',k)} d^{(k')} + \omega_n^{(k)}\left(d^{(k)}\right)^2 + \omega_n^{(k')}\left(d^{(k')}\right)^2 + \rho_n^{(k,k')} d^{(k)} d^{(k')} + \zeta_n^{(k,k')} = 0,$$

where:

$$\mu_n^{(k,k')} = 2z_n^{(k)}\left(\delta_n^{(k')} z_n^{(k')} - \delta_n^{(k)} z_n^{(k)}\right);$$

$$\omega_n^{(k)} = \left(z_0^{(k)}\right)^2 - \left(z_n^{(k)}\right)^2;$$

$$\rho_n^{(k,k')} = 2\left(z_n^{(k)} z_n^{(k')} - z_0^{(k)} z_0^{(k')}\right);$$

$$\zeta_n^{(k,k')} = 2\delta_n^{(k)}\delta_n^{(k')} z_n^{(k)} z_n^{(k')} - \left(\delta_n^{(k)} z_n^{(k)}\right)^2 - \left(\delta_n^{(k')} z_n^{(k')}\right)^2,$$

and $$z_i^{(k)}$$

designates a dot product of the following type:

$$\left\langle \vec{u}_z, \vec{r}_i^{(k)} \right\rangle.$$

Next, the respective expansions of the expressions $$\|\vec{r}_0^{(k)} - \vec{r}_0^{(k')}\|^2 = \|\vec{r}_n^{(k)} - \vec{r}_n^{(k')}\|^2 \text{ and } \left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2$$

can generate a system of biaffine equations of the following type:

$$M\begin{bmatrix} d \\ vtriu\, dd^{\top} \end{bmatrix} + q = 0$$

in which the variable d is a column vector having coefficients corresponding to the distances between the source and the microphone at different points in time 1, 2, . . . , K:

$$d = \left[d^{(1)}\ d^{(2)}\ \ldots\ d^{(K)}\right]^{\top},$$

and where the operator vtriu $dd^T$ extracts coefficients from a diagonal and above the diagonal of the matrix $dd^T$ by concatenating them into a column vector.

This system of bi-affine equations can be solved by nonlinear minimization of a cost function $\ell(\cdot)$, given by:

$$\hat{d} = \underset{lb \le d \le ub}{\operatorname{argmin}}\, \ell(Mf + q)$$

knowing that $$f\begin{bmatrix} d \\ vtriu\, dd^{\top} \end{bmatrix},$$

where lb and ub are lower and upper limits given to the distances $d^{(k)}$.

An adjustment term $\lambda r(d)$ may be added to the term $\ell(\cdot)$ to express the cost function as a whole, as follows:

$$\hat{d} = \underset{lb \le d \le ub}{\operatorname{argmin}}\, \ell(Mf + q) + \lambda r(d)$$

Such an expression with the term $\lambda r(d)$ advantageously makes it possible to adjust at least one smoothing structure applied to the coordinates of vector d (we can thus "smooth" the source's movement between two points, or conversely may wish to preserve a jerky movement for example).

Furthermore, a diagonal weighting matrix diag($\psi$) may be applied in the cost function, as follows:

$$\hat{d} = \underset{lb \le d \le ub}{\operatorname{argmin}}\, \ell(\operatorname{diag}(\psi)(Mf + q)) + \lambda r(d),$$

which amounts to weighting the different equations of the system Mf+q, for example to give preference to the weight of observations at a given point in time in comparison to other observations at another point in time.

The present invention also relates to a computer program comprising instructions for implementing the above method, when these instructions are executed by a processor of a processing circuit. It also relates to a non-transitory computer-readable storage medium on which such a program is stored.

It also relates to a computer device comprising a processing circuit configured to implement the above method.

BRIEF DESCRIPTION OF THE DRAWINGS

Other features, details and advantages will become apparent upon reading the detailed description below, and upon analyzing the attached drawings, in which.

DETAILED DESCRIPTION OF ILLUSTRATIVE EMBODIMENTS

Figure 1:
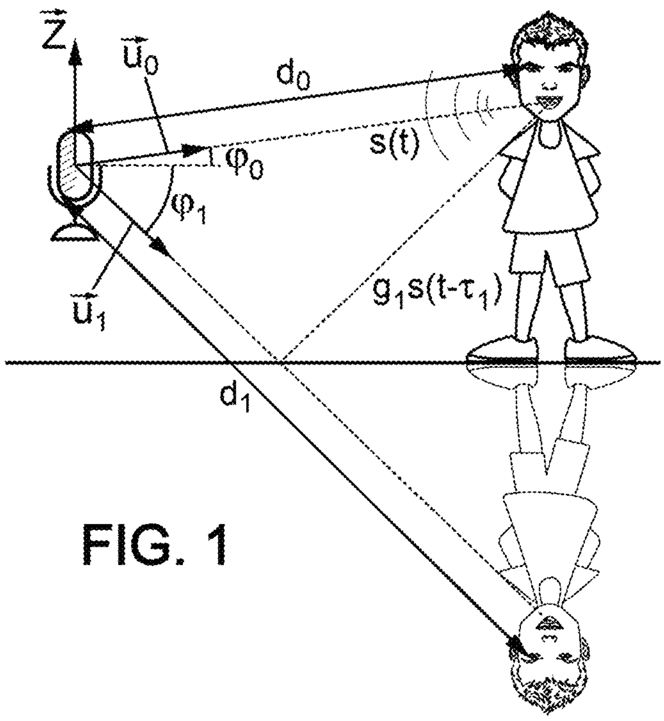
FIG. 1 shows, for illustrative purposes, various parameters which may be involved in estimating the distance from a source to the microphone.

As was briefly presented above, this description proposes estimating the distance and the direction of arrival (DoA) of a source at different points in time, for example for a moving source. The processing relating to the determination of the DoA is not impacted by movements of the source. However, it is more difficult to determine the distance from the source to the microphone for a moving source using conventional state-of-the-art methods (without knowing beforehand the orientation of the partitions that surround it).

In the detailed implementation presented below, it is proposed to use the velocity vector as in the approach of the prior art documents presented above, and first the footprint of the reflections on the generalized velocity vector, hereinafter "GTVV" (for "Generalized Time Domain Velocity Vector"), is estimated using the processing described in particular in document FR2011874. A weighting slightly different from what is described in FR2011874 may be carried out in the time-frequency domain before calculating the GTVV vector, as detailed below in one possible optional example, but the principle described in that document remains the same.

The DoA of the source is estimated by observing vector GTVV at time t=0 (as in the aforementioned document). The DoAs and the relative delays of some acoustic reflections are then detected by selecting only part of the peaks in a sequence derived from the GTVV vector (for example, its norm as a function of the delay, or possibly this norm multiplied by the sign of the omnidirectional component). Of course, this is a simple implementation but can allow for more sophisticated variants for inferring the parameters. We take from this that it is then generally possible to have a set of DoA estimates over time and their associated delays, for example per signal frame (possibly not for all frames, but for at least some, which allow continuing the processing).

In practice, the identification of peaks in the succession of peaks may be carried out using two different processing approaches which may be combined. A first processing approach searches for the DoA of the sound source itself. This processing is the easiest, because it does not require identifying the reflection peaks, their number, and the surfaces where these reflections originate. The second processing approach offers a "complete" analysis of the peaks resulting from reflections. The second processing approach is then dedicated to monitoring multiple image sources, based purely on the observed DoAs, and adapted to note and also use the observed relative delays. Here, "image sources" is understood to mean the virtual sources generated by reflections on surfaces. The result of this second processing approach gives the time sequences for the (DOA, delay) pairs, with labels corresponding to the estimated individual reflections (i.e. the "paths" of the reflections). Due to the exploitation of delays linked to reflection, application of the second processing approach then allows estimating a distance d, between the source and the microphone, to be associated with the DoA of the source, and for different discrete points in time k, k', etc. For this purpose, we exploit geometric properties presented below. A position vector for the source relative to the microphone can be constructed in the end, from the DoA of the source and from the distance separating the source from the microphone.

In one embodiment, it is in fact possible to construct a system of bi-affine equations (in which the variable is the vector of distances), using the estimated paths of the reflections and of the source at different points in time. This system is generated by applying acoustic principles relating to geometric conditions of sound propagation through space.

Next, a cost function is minimized based on this system of equations, such as the sum of squared (or absolute) residuals. This is a non-linear and non-convex minimization: known methods may be used, adapted to the use case (for example, an accelerated (sub) gradient descent, or other methods).

The representation of the GTVV vector may thus be put to good use to estimate at least the DoA and the distance from the source to the microphone for a moving sound source, without knowing the orientations of the surfaces beforehand. The paths of a moving source and the corresponding reflections are spatially and temporally related, which may be used to infer the absolute delay of the propagating source signal, and as a result, to approximate the microphone-source distance.

The objective below is to exploit the footprint of the GTVV vector in order to estimate the 3D position of a moving sound source, without hypothesizing beforehand on the orientations of the reflecting surfaces. Since the source is moving, the inference must be made for example for each frame in a succession of frames. "Frames" is understood here to mean packets of sound data acquired by a microphone (for example an ambisonic one) at discrete points in time. Thus, each frame acquired at a point in time k gives a sound image from which the current position of the moving source at time k can be derived. Several frames acquired at discrete points in time k, k', etc., should allow determining the movement of the source during these times k, k', etc.

The moving source thus provides "spatial diversity", which is then exploited to contend with the unknown geometry of the acoustic environment. Of course, this approach may be taken in a similar manner in the case where the source is fixed while the microphone is moving, due to the symmetry of the acoustic wave equations.

We refer here to equation 39 of document WO-2021/074502, which provides the expression of the velocity vector denoted $\vec{V}(t)$ as a function of the aforementioned peaks linked to the reflections and marked by Dirac delta functions positioned at delays $\tau_n$(i.e. $\delta(t-k\tau_n)$) relative to the first peak of abscissa $\tau_0$ corresponding to the arrival of the sound along the direct path. Other SARC terms are specific to reverberations and cross-reflections and are not considered:

$$\vec{V}(t) = \delta(t)\vec{u}_0 + \sum\nolimits_{n=1}^{N}\left(\sum\nolimits_{k\geq 1}\delta(t-k\tau_n)(-g_n)^k\right)(\vec{u}_0 - \vec{u}_n) + SARC \qquad \text{Eq. 39}$$

FIG. 1 recalls the orientation of the vectors $\vec{u}_0$ (associated with the source) and of the vector $\vec{u}_1$ associated with the reflection on a reflecting surface such as the ground in the illustrated example. Note that vector $\vec{u}_1$ may be associated more particularly with an image source (in thin lines relative to the original source illustrated with thick lines) which is placed on the "other side" of the reflecting surface. The original source (the child above the ground) and the image source (the child below) are represented as symmetrical relative to the surface (horizontal in the example shown). This property of symmetry of the sources is linked to the preservation of Euclidean distances (for example between two original sources on the one hand, and between their two respective image sources on the other hand). This property remains true in the acoustic approach which considers reflections as specular (which is generally the case) on planar surfaces, including for multiple reflections. This property is used and explained in more detail below, with reference to FIG. 3*a*.

To each new peak in the succession in equation 39 of document WO-2021/074502, equation 40 of the same document gives a new delay $\tau_{new}$ determined in relation to the previous delays:

$$\{k_n \geq 0\}_{n=1:N};\ \tau_{new} = \sum\nolimits_{n}^{N} k_n\tau_n;\ TAUN+1 = \tau_{N+1} = \tau_{new} \qquad \text{Eq. 40}$$

Figure 2:
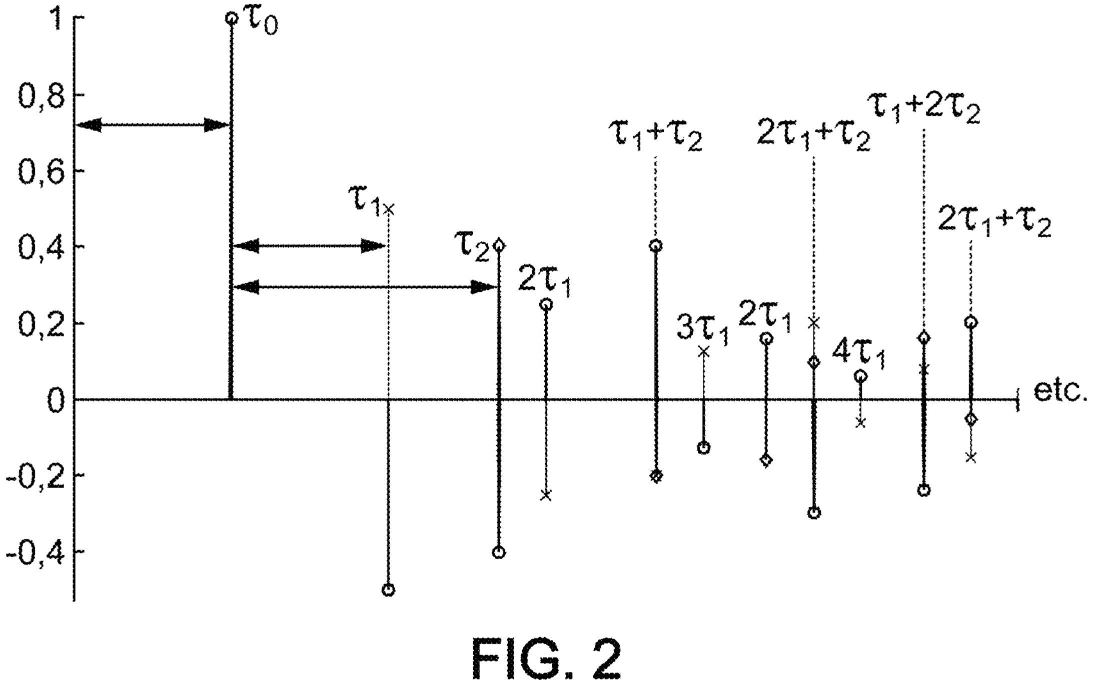
FIG. 2 shows, for illustrative purposes, the various successive peaks presented by the temporal expression of a (generalized) velocity vector after its inverse transformation from frequency to time.

The generalized velocity vector within the meaning of document FR2011874 is written in a similar manner:

$$\vec{V}_\Theta(t) = \delta(t)v_0\vec{u}_0 + v_0\sum\nolimits_{n=1}^{N}\left(\sum\nolimits_{k\geq 1}\delta(t-k\tau_n)(-g_n\beta_n)^k\right)\left(\vec{u}_0 - \frac{1}{\beta_n}\vec{u}_n\right) + SARC,$$

and thus reveals, as shown in the example in FIG. 2:

- a first peak at $\tau_0$, associated with the direct path, the vector U0 being obtained by normalization,
- as many time series as there are reflections, each associated with the interference between a reflection and the direct sound, and of abscissas $\tau_n+\tau_0$,
- and the series of combined delays denoted SARC.

As for the parameters $\beta_n$ (denoted BETAn below), based on equation Eq.B6 of document FR2011874 at the end of the appendix, we simply retain a particular relationship between two successive vectors of a series, in particular between the first two vectors V'(TAUn) and V'(2.TAUn), which are the most prominent.

The representation of the GTVV vector therefore makes it possible to directly determine the direct component (without reflection) indicating the DoA (and specific to vector U0), by simply evaluating the sequence at v (t=0). This is given by the first peak at $\tau_0$ starting from the left in the example shown in FIG. 2. Then, the differences between peaks make it possible to determine a few significant reflections by identifying and selecting peaks, because the peak index corresponds to the difference in time of arrival (TDoA) of a given reflection, denoted:

$$\tau_n \qquad (1)$$

It is therefore possible to obtain the DoA in the form of a unit vector, given for a frame of index k:

$$\vec{u}_0^{(k)}, \qquad (2)$$

as well as a collection of pairs:

$$\left\{\left(\vec{u}_n^{(k)}, \tau_n^{(k)}\right)\right\}_n \qquad (3)$$

corresponding to the detected reflections and to their associated differences in times of arrival TDoA.

The position of the source relative to the microphone array (which may correspond to an ambisonic microphone) is given by the vector:

$$\vec{r}_0^{(k)} = d^{(k)}\vec{u}_0^{(k)}, \quad (4)$$

and, similarly, the position of the nth image source is given by $$\vec{r}_n^{(k)} = \left(d^{(k)} + \delta_n^{(k)}\right)\vec{u}_n^{(k)}, \quad (5)$$

with $$\delta_n^{(k)} = c\tau_n^{(k)},$$

where $C\tau_n^{(k)}$ is the speed of sound.

Similarly, if the same reflection is detected in another frame k', the equivalent expressions for the position vectors $$\vec{r}_0^{(k\prime)}$$

and $$\vec{r}_n^{(k\prime)}$$

would be obtained.

We consider here that the reflections detected, estimated and used in the model are assumed to be specular. It is then possible to use simple geometric arguments to arrive at the estimation of a distance d(k) to the frame indexed by the variable k. Indeed, the source images are obtained based on the positions of the original sources by applying certain rigid transformations: reflections, translations, or rotations (depending on the order and arrangement of the reflecting surfaces). In principle, rigid transformations preserve Euclidean distances.

Figure 3A:
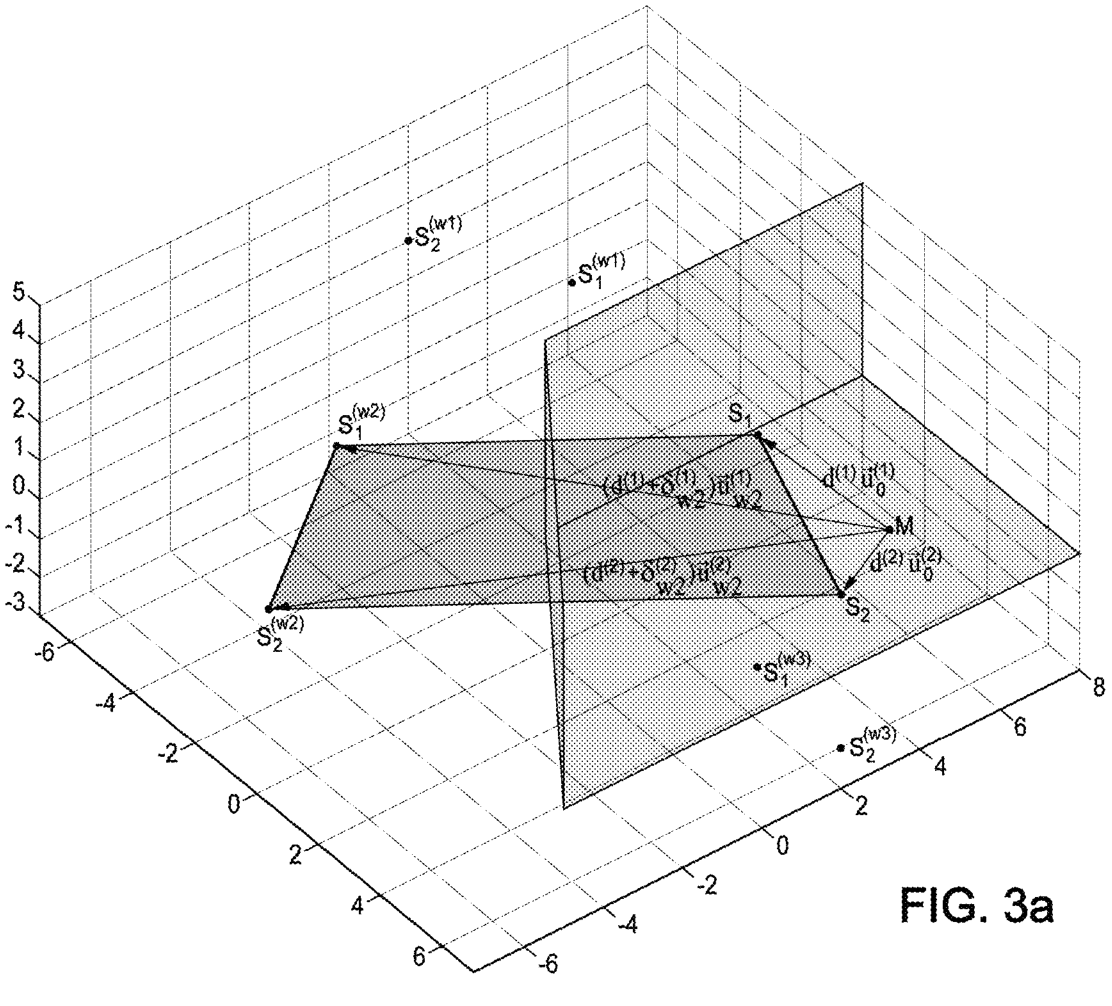
FIG. 3*a* illustrates the abovementioned property of preservation of Euclidean distances.

In FIG. 3*a*, two successive positions of a source are illustrated, at S1 then at S2, as well as the position of the microphone M (assumed to be fixed in this example). Also illustrated are the respective positions of the successive image sources in relation to a first surface w1 at $S1^{(w1)}$ and $S2^{(w1)}$ and in relation to a second surface w2 at $S1^{(w2)}$ and $S2^{(w2)}$. As can be seen in particular for images $S1^{(w2)}$ and $S2^{(w2)}$ in this figure, the distance between the respective positions of images $S1^{(w2)}$–$S2^{(w2)}$ associated with a same surface w2 is equal to the distance between the respective source positions S1-S2. This figure thus illustrates the preservation of Euclidean distances between source positions and image positions.

This property of distance preservation is expressed as:

$$\left\|\vec{r}_0^{(k)} - \vec{r}_0^{(k')}\right\|^2 = \left\|\vec{r}_n^{(k)} - \vec{r}_n^{(k')}\right\|^2. \quad (6)$$

By expanding this expression using (4) and (5), we obtain:

$$\alpha_n^{(k,k')}d^{(k)} + \alpha_n^{(k',k)}d^{(k')} + \chi_n^{(k,k')}d^{(k)}d^{(k')} + \kappa_n^{(k,k')} = 0, \quad (7)$$

with:

$$\alpha_n^{(k,k')} = 2\left(\delta_n^{(k)} - \xi_n^{(k,k')}\delta_n^{(k')}\right),$$

$$\chi_n^{(k,k')} = 2\left(\xi_0^{(k,k')} - \xi_n^{(k,k')}\right),$$

$$\kappa_n^{(k,k')} = \left(\delta_n^{(k)}\right)^2 + \left(\delta_n^{(k')}\right)^2 - 2\delta_n^{(k)}\delta_n^{(k')}\xi_n^{(k,k')},$$

$$\xi_n^{(k,k')} = \left\langle\vec{u}_n^{(k)}, \vec{u}_n^{(k')}\right\rangle,$$

where <x,y> corresponds to the dot product between vectors x and y.

An attractive quality of the assumption of distance preservation is that it does not require any specific assumptions about the geometry of the environment. A slightly more restrictive assumption, but in practice still very plausible, is to consider all reflective surfaces as being either horizontal (floors, ceilings, tables, etc.) or vertical (walls, windows, etc.). Such an assumption should nevertheless allow vertical surfaces to form arbitrary angles to each other, for example the angle of a door relative to the wall which supports it.

In order to exploit this assumption, the z-axis of the local coordinate system of the ambiophonic microphone must preferably be aligned with the z-axis of the general coordinate system (of the room). This is generally true, because the microphone is most often placed on a horizontal surface (such as a table) or is mounted on a vertical stand. If this is the case, the projection of the magnitude of the displacement vector on the z axis, for any index n, is equivalent to the same projection of the magnitude of the displacement vector of the corresponding source $$\vec{r}_0^{(k\prime)} - \vec{r}_0^{(k)},$$

which is:

$$\left\langle\vec{u}_z, \vec{r}_n^{(k')} - \vec{r}_n^{(k)}\right\rangle^2 = \left\langle\vec{u}_z, \vec{r}_0^{(k')} - \vec{r}_0^{(k)}\right\rangle^2, \quad (8)$$

with: $\vec{u}_z=[0\ 0\ 1]^T$

Figure 3B:
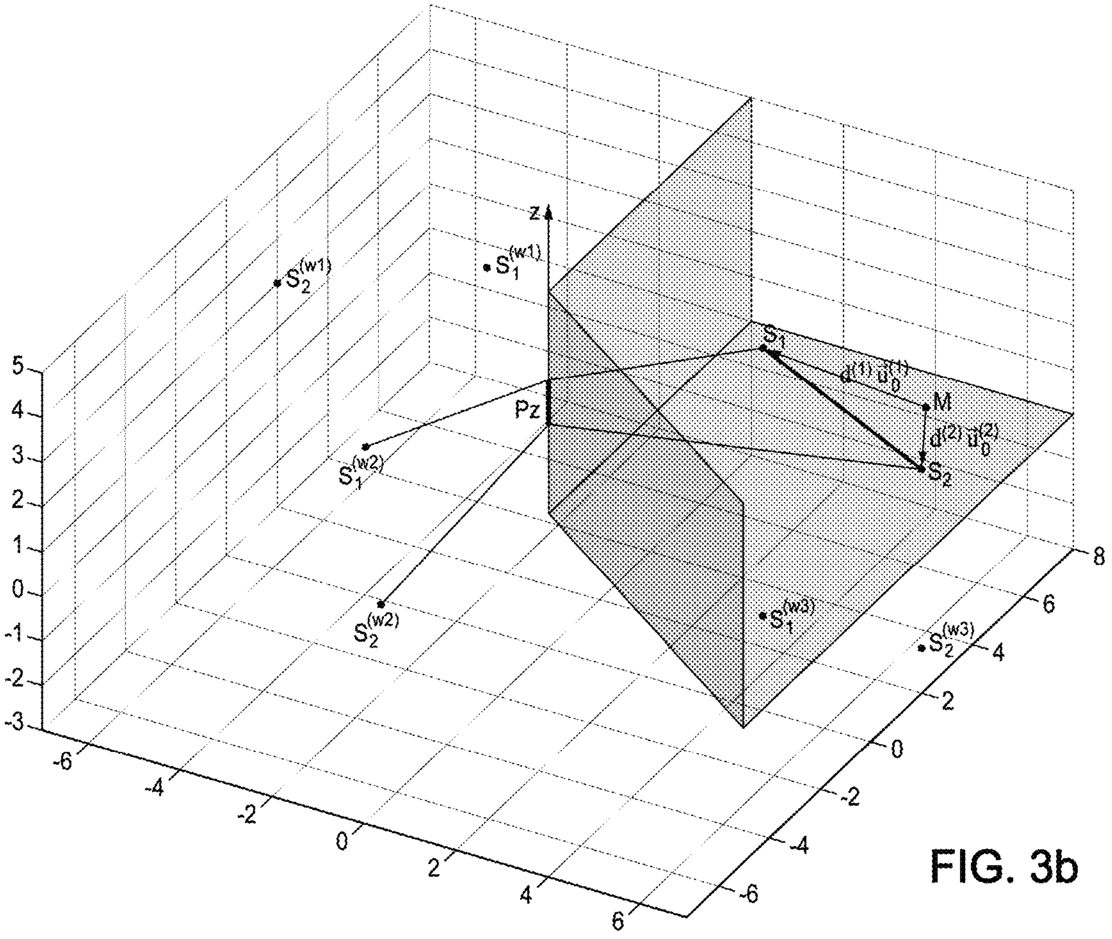
FIG. 3*b* illustrates the abovementioned second property of preservation of the projection on the chosen axis.

Referring now to FIG. 3*b*, this other geometric property (in addition to the preservation of Euclidean distances, but derived from it even so) is expressed as follows: the projection of the distance between source positions S1-S2 on the z axis (parallel to the axis of the microphone M) is equal to the same projection of the distance between image positions $S1^{(w2)}$-$S2^{(w2)}$ associated with the same surface w2. More precisely, the projection of the "magnitude" (positive amplitude) of the displacement vector S1-S2 is equal to the same projection of the vector between $S1^{(w2)}$ and $S2^{(w2)}$. The term "magnitude of the vector" here designates a distance (therefore positive).

This property is satisfied geometrically if the surfaces considered are parallel or perpendicular to the z axis. Indeed, if a surface is vertical (parallel to the z axis) or horizontal (perpendicular to the z axis), the equations given here do not change because the projected magnitude (illustrated by the reference Pz and a bold line in FIG. 3*b*) is always preserved in both cases.

By expanding equation (8) with equations (4) and (5), we obtain:

$$\mu_n^{(k,k')} d^{(k)} + \mu_n^{(k',k)} d^{(k')} + \omega_n^{(k)} \left(d^{(k)}\right)^2 + \omega_n^{(k')} \left(d^{(k')}\right)^2 + \rho_n^{(k,k')} d^{(k)} d^{(k')} + \zeta_n^{(k,k')} = 0, \tag{9}$$

with:

$$\mu_n^{(k,k')} = 2 z_n^{(k)} \left(\delta_n^{(k')} z_n^{(k')} - \delta_n^{(k)} z_n^{(k)}\right); \tag{10}$$

$$\omega_n^{(k)} = \left(z_0^{(k)}\right)^2 - \left(z_n^{(k)}\right)^2;$$

$$\rho_n^{(k,k')} = 2 \left(z_n^{(k)} z_n^{(k')} - z_n^{(k)} z_n^{(k')}\right);$$

$$\zeta_n^{(k,k')} = 2 \delta_n^{(k)} \delta_n^{(k')} z_n^{(k)} z_n^{(k')} - \left(\delta_n^{(k)} z_n^{(k)}\right)^2 - \left(\delta_n^{(k')} z_n^{(k')}\right)^2,$$

and $$z_i^{(k)}$$

designates the dot product $$\langle \vec{u}_z, \vec{r}_i^{(k)} \rangle.$$

It should be noted that the preservation of distance is not guaranteed under equation (8). Therefore, instead of being used independently, this condition instead complements the condition given in equation (6). Expressions (7) and (9) can be written concisely as follows:

$$m^{(k,k')^\top} \begin{bmatrix} d \\ vtriu\, dd^\top \end{bmatrix} + q_n^{(k,k')} = 0, \tag{11}$$

where $$m^{(k,k')^\top}. = \left[0 \ \ldots \ \alpha_n^{(k,k')} 0 \ \ldots \ \alpha_n^{(k',k)} 0 \ \ldots \ \chi_n^{(k,k')} \ \ldots \ 0\right]^\top,$$

and $$q_n^{(k,k')} = \kappa_n^{(k,k')},$$

for the model based on equation (7); or $$m^{(k,k')^\top} = \left[0 \ \ldots \ \mu_n^{(k,k')} 0 \ \ldots \ \mu_n^{\left(k',\hat{k}\right)} 0 \ \ldots \ \omega_n^{(k,k')} 0 \ \ldots \ \omega_n^{(k',k)} 0 \ \ldots \ \rho_n^{(k,k')} \ \ldots \ 0\right]^\top,$$

and $$q_n^{(k,k')} = \zeta_n^{(k,k')},$$

for the model based on equation (8).

The operator vtriu $dd^T$ extracts the coefficients of the diagonal as well as those above the diagonal of matrix $dd^T$ and concatenates its entries into a column vector.

Finally, the vector $$d = \left[d^{(1)} \ d^{(2)} \ \ldots \ d^{(K)}\right]^\top,$$

contains the estimated distances between the source and the microphone $d^{(k)}$ for each frame k belonging to a set of frames indexed from 1 to K. We specify here that the frames are not necessarily successive, meaning that they do not necessarily come immediately after one another in time. For example, these may be frames of duration T such that the first one indexed k=1 is sent at time t, the second one k=2 is sent at t+4T, the one indexed k=3 is sent at t+5T, the one indexed k=4 is sent at t+7T, etc.

It is possible to obtain the position of the source relative to the microphone M at different points in time in its movement, these times being reflected here by the frame index k.

By assembling at least two frames at different points in time k and k'belonging to [1, K]×[1, K] and where a same reflection has been observed on a same surface, a system of equations is reached which is generally overdetermined (more equations than solutions), of the type:

$$M \begin{bmatrix} d \\ vtriu\, dd^\top \end{bmatrix} + q = 0. \tag{12}$$

The following notations are used below:

$M_{DP}$, $q_{DP}$, the systems corresponding to the property of preservation of Euclidean distances, and $M_{HV}$, $q_{HV}$, the systems corresponding to the assumption of surfaces parallel or perpendicular to the z axis of the microphone.

It is thus possible to present the two geometric conditions at once, simultaneously, by assembling the two systems into a single combined system:

$$M = \begin{bmatrix} M_{DP} \\ M_{HV} \end{bmatrix} \text{ and }$$

$$q = \begin{bmatrix} q_{DP} \\ q_{HV} \end{bmatrix}.$$

Finally, the estimation of the distance vector d boils down to a regression problem based on the nonlinear system (12), as follows:

$$\hat{d} = \underset{lb \le d \le ub}{\operatorname{argmin}} \ \ell(MF + q) + \lambda r(d), \tag{13}$$

knowing that $$f = \begin{bmatrix} d \\ vtriu\, dd^\top \end{bmatrix}, \tag{14}$$

where 0</b<ub respectively designate the lower and upper limits of the distance estimation. The term indicating the "faithfulness" of data $\ell(-)$ is generally a type of norm (squared or not), such as the sum of squares ($\ell=\ell_2^2$), or the absolute values ($\ell=\ell_1$).

The first solution leads to a smoothed optimization problem, but the advantage of the $\ell_1$ norm is that it may be more robust against possible errors in system parameters (extracted DoAs and relative delays). An alternative could be the use of "structured" standards (for example $\ell_{1,2}$) if the parameters linked to some reflections are significantly more erroneous than others. The regularization term $\lambda r(d)$ may optionally be added to induce additional structure in vector d, for example to smooth the path of the source. Alternatively, by adjusting this term, one can facilitate detection of a movement of a source moving in "hops" from one position to another, this term r(d) encouraging for example a vector d which is only constant per path segments (and therefore not smoothed due to these "hops").

In the above matrix expression:

$$M = \begin{bmatrix} M_{DP} \\ M_{HV} \end{bmatrix}$$

it is possible to weight one of the systems $M_{DP}$ or $M_{HV}$ relative to the other $M_{HV}$ or $M_{DP}$ in order for example to give more weight to one of the geometric properties over the other, depending for example on the sound acquisition conditions.

It is also possible to provide a linear combination of $M_{DP}$ and $M_{HV}$, for example:

$$M = M_{DP} - M_{HV} \text{ and } q = q_{DP} - q_{HV}$$

Furthermore, it is also possible to apply a weighting in equation (13) as follows:

$$\hat{d} = \underset{lb \le d \le ub}{\operatorname{argmin}}\ \ell(\operatorname{diag}(\psi)(Mf + q)) + \lambda r(d)$$

which amounts to adding a diagonal matrix ψ aimed at weighting the different equations of the system Mf+q. This weighting may be produced by applying confidence criteria to the extraction of parameters such as delays, DoA, etc., for example, for certain frames or peaks identified in these frames. For example, it may give preference to frames in which sound onset is detected (to exploit the direct sound and the first reflections for example).

Problem (13) is non-convex, and a local solution may be found by applying a non-linear optimization method. In particular, a Fast Adaptive Shrinkage/Thresholding (FASTA) type algorithm may be used, providing it with the appropriate (sub) gradient of a cost function.

An advantage of the temporal representation of the velocity vector exploited with the processing presented here is that it is possible to group individual reflections in time. In other words, in addition to tracking the source DoA, it is proposed here to further rely on the determination of reflections to strengthen the determination of the source/microphone distance over time.

Thus, the tracking algorithm described in the prior art documents cited above FR2011874 and WO-2021/074502, may be modified so that it can process observations in DoA form and associated relative delays. A simple modification of this processing may consist of providing the measurements in the form of scaled vectors $$\left\{\delta_i^{(k)} \vec{u}_i^{(k)}\right\} i,$$

which allows the tracking processing to discriminate between reflections of very similar DoAs (e.g. the case of a source near a surface), possibly adding a certain "depth" to the observations. In practice, two instances of tracking processing may be implemented:

- the first instance tracks the source itself, and is therefore responsible for estimating the path of a single target using the DoA obtained using v(t=0) (position of the first peak relative to the initial time t=0);
- the second instance in the processing performs multi-target tracking of reflections by using the remaining observations (directions and relative delays obtained from the remaining peaks in the sequence of the GTVV velocity vector).

Finally, it should be noted that, when defining the two aforementioned geometric conditions, it is possible to consider a pair of reflections (provided that they are both detected at two discrete points in time k and k'), instead of pairing the parameters of the source and of a single reflection. For example, based on at least two reflections, it would be possible to determine the parameters linked to these reflections and to deduce the source-microphone distance. However, tracking the reflections is generally less stable and less accurate than directly tracking the DoA of the source. For example, some reflections may appear and disappear depending on the current position of the source, because they may become "invisible" from the microphone.

Furthermore, the case of a source which may be moving and thus may occupy discrete positions at respective points in time has been described above. However, the processing proposed here may also be adapted to the case of several sources having these respective discrete positions at these different points in time. The aforementioned exploitation of reflections may then be applied by obtaining information which allows distinguishing between the reflections corresponding to each source (for example by spectral analysis if the sources are emitting in different fundamental frequencies, or other means).

In order to give preference to exploiting the first reflections and avoiding multiple reflections which are more difficult to exploit, it is possible to weight the signals received by giving preference to the onset of sounds, as presented with reference to FIG. 5*a* of the documents cited above.

Figure 4:
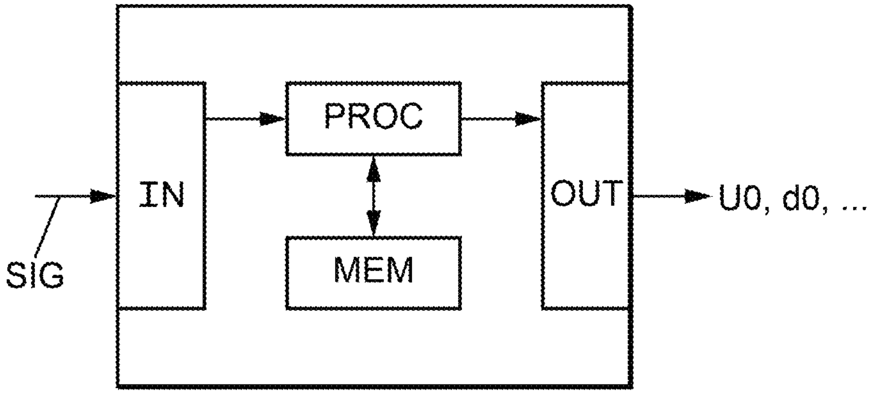
FIG. 4 schematically shows a device for implementing the above method, according to one embodiment.

FIG. 4 illustrates an example of a device for processing sound signals, comprising a processing circuit arranged to implement the above method. Such a processing circuit may then comprise:

- an input interface IN for receiving receive signals SIG acquired by the microphone (which may comprise several piezoelectric discs for composing these signals, for example in an ambisonic context),
- a processor PROC which cooperates with a working memory MEM to process these signals, in particular to develop the expression of the generalized velocity vector in order to derive the desired parameters d0, U0, etc., these parameters values possibly being used to determine the distances $d^{(1)}, d^{(2)}, \ldots, d^{(K)}$ between the source and the microphone and also being delivered via the output interface OUT.

Such a device may take the form of a module for locating a sound source in a 3D environment, this module being connected to a microphone (sound antenna or other type). Conversely, it may be an engine for rendering sound based on a given position of a source in a virtual space (comprising one or more surfaces) in augmented reality.

More generally, the object of the present description may be used in numerous applications, such as:

- spatial audio coding,
- the immersive experience (with six degrees of freedom) in augmented reality,
- improving the spatial separation of sources,
- monitoring multiple sources (active simultaneously or not),
- assisting with robot navigation and instant mapping or "SLAM" (for "Simultaneous Localization and Mapping"), with a possible extension of the above principles to non-acoustic signals (for example radio waves).

Although the present disclosure has been described with reference to one or more examples, workers skilled in the art will recognize that changes may be made in form and detail without departing from the scope of the disclosure and/or the appended claims.

The invention claimed is:

1. A method for processing sound signals acquired by at least one microphone, in order to locate at least one sound source emitting from a plurality of discrete positions at respective discrete points in time, in a space comprising at least one planar reflective surface, the method being implemented by a device and comprising:

receiving the sound signals;

obtaining from the sound signals at least, for each point in time k:

a first vector $$\vec{u}_0^{(k)}$$

determining a direction of a first acoustic path, direct between the source and the microphone, at least a second vector $$\vec{u}_n^{(k)}$$

representing a second acoustic path resulting from at least one specular reflection and arriving at the microphone, at least one delay $$\tau_n^{(k)}$$

of the second path at the microphone, compared to the direct first acoustic path; and exploiting at least one property of the specular reflection, according to which a Euclidean distance between two positions of the source at two discrete points in time is equal to a Euclidean distance between two respective positions of images of the source and derived from one or a plurality of same reflections, respectively at said two discrete points in time, in order to determine at least one position of the source relative to the microphone respectively at said plurality of discrete points in time, as a function of, for each point in time k:

the first vector $$\vec{u}_0^{(k)}$$

in order to determine a direction of the direct first acoustic path, and both the delay $$\tau_n^{(k)}$$

and the second vector $$\vec{u}_n^{(k)},$$

in order to associate a distance $d^{(k)}$ between the source and the microphone with this direction of the direct first acoustic path.

2. The method according to claim 1, further comprising:

exploiting, in addition to said property of specular reflection, a second geometric property according to which a projection on a chosen axis of said Euclidean distance between two positions of the source at two discrete points in time corresponds to a projection on the same chosen axis of the Euclidean distance between two respective positions of images of the source and derived from one or a plurality of same reflections, respectively at said two discrete points in time.

3. The method according to claim 2, wherein the chosen axis is parallel or perpendicular to said at least one surface.

4. The method according to claim 2, wherein the microphone is of the ambisonic type, and arranged so that the z axis along the height of the microphone is parallel to the chosen axis.

5. The method according to claim 2, wherein the exploitation of said property of specular reflection, combined with the exploitation of the second geometric property, generates an overdetermined system of equations in which the positions of the source relative to the microphone, for different points in time k, k', are the unknowns.

6. The method according to claim 1, wherein the sound signals are acquired in a succession of frames over time, and wherein the first vector $$\vec{u}_0^{(k)},$$

the second vector $$\vec{u}_n^{(k)},$$

and the delay $$\tau_n^{(k)}$$

are obtained for a plurality of frames respectively corresponding to discrete points in time.

7. The method according to claim 1, wherein at least one parameter among the first vector $$\vec{u}_0^{(k)},$$

the second vector $$\vec{u}_n^{(k)},$$

and the delay $$\tau_n^{(k)}$$

is obtained from the expression of a generalized velocity vector, the method comprising:

applying a time-frequency transform to the acquired signals, based on the acquired signals, expressing a generalized velocity vector in the frequency domain, for a plurality of discrete points in time, each generalized velocity vector for a given point in time k characterizing a composition between:

the first acoustic path, direct between the source and the microphone, represented by the first vector $$\vec{u}_0^{(k)},$$

and having a delay $$\tau_0^{(k)}$$

between the emission of a sound by the source and the reception of this sound by the microphone, and at least the second acoustic path, represented by the second vector $$\vec{u}_n^{(k)},$$

and having delay $$\tau_n^{(k)}$$

at the microphone, relative to the direct first acoustic path.

8. The method according to claim 7, comprising:

further applying an inverse transform, from frequency to time, to the generalized velocity vector in order to obtain, in the time domain, at least one peak linked to one or more reflections on one or more surfaces, in addition to a peak linked to an arrival of the sound along said direct first acoustic path, the peak linked to one or more reflections being shifted by delay $$\tau_n^{(k)}$$

relative to the peak linked to the arrival of the sound along the direct first acoustic path.

9. The method according to claim 1, wherein:

a vector $$\vec{r}_0^{(k)}$$

between the source and the microphone, at a point in time k, written as a function of the first vector $$\vec{u}_0^{(k)}:\vec{r}_0^{(k)} = d^{(k)}\vec{u}_0^{(k)},$$

where $d^{(k)}$ is the Euclidean distance at point in time k between the source and the microphone, a vector $$\vec{r}_0^{(k)}$$

between an image of the source and the microphone, at a point in time k, written as a function of the second vector $$\vec{u}_n^{(k)}:\vec{r}_n^{(k)} = \left(d^{(k)} + \delta_n^{(k)}\right)\vec{u}_n^{(k)}, \text{ with } \delta_n^{(k)} = c \cdot \tau_n^{(k)},$$

where c is the speed of sound, said property of specular reflection is expressed, for two discrete points in time k and k', by an expression of the type:

$$\left\|\vec{r}_0^{(k)} - \vec{r}_0^{(k')}\right\|^2 = \left\|\vec{r}_n^{(k)} - \vec{r}_n^{(k')}\right\|^2.$$

10. The method according to claim 9, wherein the expression $$\left\|\vec{r}_0^{(k)} - \vec{r}_0^{(k')}\right\|^2 = \left\|\vec{r}_n^{(k)} - \vec{r}_n^{(k')}\right\|^2$$

expands into:

$$\alpha_n^{(k,k')}d^{(k)} + \alpha_n^{(k',k)}d^{(k')} + \chi_n^{(k,k')}d^{(k)}d^{(k')} + \kappa_n^{(k,k')} = 0,$$

with:

$$\alpha_n^{(k,k')} = 2\left(\delta_n^{(k)} - \xi_n^{(k,k')}\delta_n^{(k')}\right),$$

$$\chi_n^{(k,k')} = 2\left(\xi_0^{(k,k')} - \xi_n^{(k,k')}\right),$$

-continued $$\kappa_n^{(k,k')} = \left(\delta_n^{(k)}\right)^2 + \left(\delta_n^{(k')}\right)^2 - 2\delta_n^{(k)}\delta_n^{(k')}\xi_n^{(k,k')}$$

$$\xi_n^{(k,k')} = \langle \vec{u}_n^{(k)}, \vec{u}_n^{(k')} \rangle,$$

where the notation <x,y>designates the dot product between two vectors x and y.

11. The method according to claim 3, wherein said second geometric property results in an expression of the type:

$$\left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2,$$

where:

$\vec{u}_z$ is a unit vector parallel to said chosen axis, the notation <x,y>designates the dot product between two vectors x and y, $$\vec{r}_0^{(k)}$$

is a vector between the source and the microphone, at a point in time k, written in terms of the first vector $$\vec{u}_0^{(k)}: \vec{r}_0^{(k)} = d^{(k)}\vec{u}_0^{(k)},$$

where $d^{(k)}$ is the Euclidean distance at point in time k between the source and the microphone, $$\vec{r}_n^{(k)}$$

is a vector between an image of the source and the microphone, at a point in time k, written as a function of the second vector $$\vec{u}_n^{(k)}: \vec{r}_n^{(k)} = \left(d^{(k)} + \delta_n^{(k)}\right)\vec{u}_n^{(k)}, \text{ with } \delta_n^{(k)} = c \cdot \tau_n^{(k)},$$

where c is the speed of sound, said expression $$\left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2$$

expanding into:

$$\mu_n^{(k,k')}d^{(k)} + \mu_n^{(k',k)}d^{(k')} + \omega_n^{(k)}\left(d^{(k)}\right)^2 + \omega_n^{(k')}\left(d^{(k')}\right)^2 + \rho_n^{(k,k')}d^{(k)}d^{(k')} + \zeta_n^{(k,k')} = 0,$$

where:

$$\mu_n^{(k,k')} = 2z_n^{(k)}\left(\delta_n^{(k')}z_n^{(k')} - \delta_n^{(k)}z_n^{(k)}\right);$$

$$\omega_n^{(k)} = \left(z_0^{(k)}\right)^2 - \left(z_n^{(k)}\right)^2;$$

-continued $$\rho_n^{(k,k')} = 2\left(z_n^{(k)}z_n^{(k')} - z_0^{(k)}z_0^{(k')}\right);$$

$$\zeta_n^{(k,k')} = 2\delta_n^{(k)}\delta_n^{(k')}z_n^{(k)}z_n^{(k')} - \left(\delta_n^{(k)}z_n^{(k)}\right)^2 - \left(\delta_n^{(k')}z_n^{(k')}\right)^2,$$

and $$z_i^{(k)}$$

designates the dot product $$\left\langle \vec{u}_z, \vec{r}_i^{(k)} \right\rangle.$$

12. The method according to claim 11, wherein the respective expansions of the expressions $$\left\|\vec{r}_0^{(k)} - \vec{r}_0^{(k')}\right\|^2 = \left\|\vec{r}_n^{(k)} - \vec{r}_n^{(k')}\right\|^2 \text{ and } \left\langle \vec{u}_z, \vec{r}_n^{(k')} - \vec{r}_n^{(k)} \right\rangle^2 = \left\langle \vec{u}_z, \vec{r}_0^{(k')} - \vec{r}_0^{(k)} \right\rangle^2$$

generate a system of bi-affine equations of the type:

$$M\begin{bmatrix} d \\ \text{vtriu}\, dd^\top \end{bmatrix} + q = 0$$

in which the variable d is a column vector having coefficients corresponding to the distances between the source and the microphone at different points in time 1, 2, . . . , K:

$$d = [d^{(1)} \;\; d^{(2)} \;\; \ldots \;\; d^{(K)}]^\top,$$

and where the operator vtriu $dd^T$ extracts coefficients from a diagonal and above the diagonal of the matrix $dd^T$ by concatenating them into a column vector.

13. The method according to claim 12, comprising a solving of said system of bi-affine equations by non-linear minimization of a cost function $\ell(\cdot)$, given by:

$$\hat{d} = \underset{lb \le d \le ub}{\operatorname{argmin}}\ \ell(MF + q)$$

knowing that $$f = \begin{bmatrix} d \\ \text{vtriu}\, dd^\top \end{bmatrix},$$

where lb and ub are lower and upper limits given to the distances $d^{(k)}$.

14. The method according to claim 13, wherein an adjustment term $\lambda r(d)$ is added to $\ell(\cdot)$ to express the cost function as a whole, as follows:

$$\hat{d} = \underset{lb \le d \le ub}{\operatorname{argmin}}\ \ell(Mf + q) + \lambda r(d)$$

the term λr(d) making it possible to adjust at least one smoothing structure applied to the coordinates of the vector d.

15. The method according to claim 13, wherein a diagonal weighting matrix diag(ψ) is applied in the cost function, as follows:

$$\hat{d} = \underset{lb \leq d \leq ub}{\operatorname{argmin}}\ \ell(\operatorname{diag}(\psi)(Mf + q)) + \lambda r(d).$$

16. A non-transitory computer readable storage medium on which a program is stored, said program comprising instructions for implementing the method according to claim 1, when said instructions are executed by a processor of a processing circuit of the device.

17. A computer device comprising:

a processing circuit configured to implement a method of processing sound signals acquired by at least one microphone, in order to locate at least one sound source emitting from a plurality of discrete positions at respective discrete points in time, in a space comprising at least one planar reflective surface, the method comprising:

receiving the sound signals;

obtaining from the sound signals at least, for each point in time k:

a first vector $$\vec{u}_0^{(k)}$$

determining a direction of a first acoustic path, direct between the source and the microphone, at least a second vector $$\vec{u}_n^{(k)}$$

representing a second acoustic path resulting from at least one specular reflection and arriving at the microphone, at least one delay $$\tau_n^{(k)}$$

of the second path at the microphone, compared to the direct first acoustic path; and exploiting at least one property of the specular reflection, according to which a Euclidean distance between two positions of the source at two discrete points in time is equal to a Euclidean distance between two respective positions of images of the source and derived from one or a plurality of same reflections, respectively at said two discrete points in time, in order to determine at least one position of the source relative to the microphone respectively at said plurality of discrete points in time, as a function of, for each point in time k:

the first vector $$\vec{u}_0^{(k)}$$

in order to determine a direction of the direct first acoustic path, and both the delay $$\tau_n^{(k)}$$

and the second vector $$\vec{u}_n^{(k)},$$

in order to associate a distance $d^{(k)}$ between the source and the microphone with this direction of the direct first acoustic path.

* * * * *